Nov. 14, 1939.  F. C. MARTIN  2,180,010
FILM HOLDER
Filed June 10, 1938
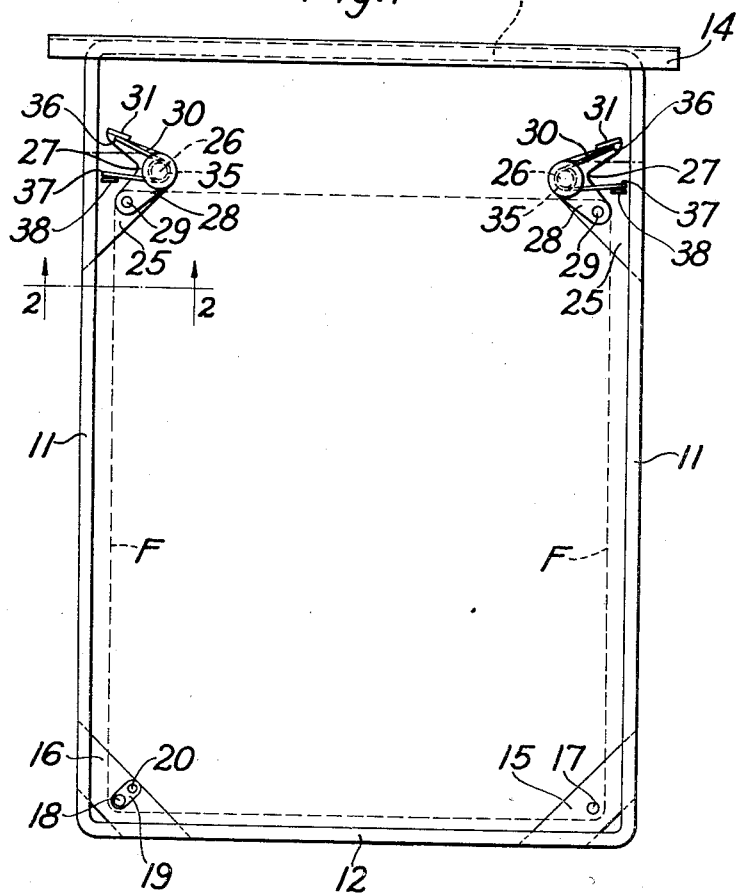
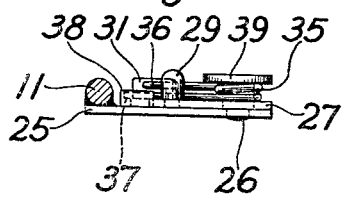
Frederick C. Martin
INVENTOR
BY
ATTORNEYS Patented Nov. 14, 1939

2,180,010

UNITED STATES PATENT OFFICE 2,180,010

FILM HOLDER

Frederick C. Martin, Rochester, N. Y., assignor to Eastman Kodak Company, Rochester, N. Y., a corporation of New Jersey Application June 10 1938, Serial No. 212,986

5 Claims. (Cl. 95—100)

The present invention relates to a film holder, and more particularly to a holder primarily intended for X-ray film.

One object of the invention is the provision of a holder which is adapted to support a sheet of X-ray film while the latter is immersed in the developing solution, and during the fixing, washing, and drying operations.

A further object of the invention is the provision of a holder of the class described, which is neat, rugged, compact, and which comprises comparatively few and simple parts which are relatively inexpensive to manufacture, simple in construction, and easy to operate.

Another object of the invention is the provision of a holder which engages the film only adjacent the corners thereof, and which is so arranged as to permit easy and ready removal and/or replacement of films therein.

To these and other ends the invention resides in certain improvements and combinations of parts, all as will be hereinafter more fully described, the novel features being pointed out in the claims at the end of the specification.

In the drawing:

Fig. 1 is a front elevation of a film holder constructed in accordance with the preferred embodiment of the invention; and Fig. 2 is a horizontal sectional view taken substantially on line 2—2 of Fig. 1, showing the method of spring mounting certain of the film engaging members so as to tension the film to hold the latter in flat condition.

Fig. 1 shows a film holder comprising an open rectangular wire frame formed to provide parallel side members 11, and parallel bottom and top cross members 12 and 13 respectively. The top member 13 is secured in any suitable way such, as by welding, to a top rail 14 which in the present embodiment comprises a channel, although other suitable forms may be used. The top rail provides a means for resting the frame upon the top of the various containers in which the developing and fixing solutions are contained, and permit the frame and the film supported therein to hang in a vertical position in the containers.

Diagonal brackets 15 and 16 are welded, or otherwise secured, to opposite ends of the bottom member 12 and to the lower ends of the side members 11, as clearly shown in Fig. 1. The bracket 15 is formed with a stationary peg or lug 17 adapted to extend into a perforation formed in the lower right-hand corner of the film strip F, as viewed in Fig. 1, to support said corner. A similar lug 18 engages and supports the lower left-hand corner of the strip F. The lug 18 is, however, preferably mounted on an arm 19 pivoted at 20 on the bracket 16 so that the lug 18 may be moved slightly to register with the adjacent film perforation formed in the corner of the strip F. Thus the lower corners of the film strip are supported by the stationary lug 17 and by the adjustable lug 18.

The side members 11 have welded, or otherwise secured, thereto a pair of inwardly extending brackets 25 positioned adjacent the upper corners of the film strip F, as clearly illustrated in Fig. 1. Each of these brackets carries a pivot pin 26 on which is loosely mounted a bellcrank 27 one arm 28 of which is provided with a lug 29 adapted to enter a perforation formed adjacent the upper corner of the film strip F, all as shown in Fig. 1. The other arm 30 of the bellcrank is formed with a finger-piece 31 by which the bellcrank 27 may be rotated about its pivot pin 26 to bring the lug 29 into registry with the adjacent film perforation.

In order to maintain the film strip in a taut or tensioned condition while mounted in the holder, each bellcrank 27 is preferably spring mounted, and tends to rotate the lug 29 upwardly and outwardly to stretch the film strip. To this end, a coil spring 35 is wrapped around each of the pivot pins 26, and has one end 36 thereof hooked under the finger-piece 31 while the other end 37 rests on a lug 38 formed on the bracket 25. These springs thus resiliently support the bellcranks 27 and tend to rotate the latter about the pivot pins 26 to move the lugs 29 upwardly and outwardly, as is apparent from inspection of Fig. 1, to maintain the strip F in a stretched or taut condition, the advantages of which are apparent to those in the art. Each spring 35 is held in position between the bellcrank 27 and a head 39 formed on the pivot pin 26, as clearly shown in Fig. 2.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. A film holder comprising a top rail, a rectangular open frame fixed at one end to said rail, a plurality of spaced apart brackets secured to said frame adjacent the corners thereof, stationary means mounted on one of said brackets and arranged to engage a film strip adjacent one corner thereof, pivotally mounted members on the others of said brackets, means on said members for engaging said strip adjacent the remaining corners thereof, and means for moving certain of said members about their pivots to tension said strip to maintain the latter in flat position.

2. A film holder comprising a top rail, a rectangular open metal frame fixed at one end to said rail, a plurality of spaced apart brackets secured to said frame adjacent the corners thereof, a stationary lug mounted on one of said brackets and arranged to enter a perforation formed in a film strip adjacent one corner thereof, movably mounted members on the others of said brackets, film engaging lugs on said members arranged to enter perforations adjacent the remaining corner of said strip, and means on certain of said brackets for moving the members thereon relative to each other and to said other member and said stationary lug for tensioning said strip.

3. A film holder comprising a top rail, a rectangular open metal frame secured at one end to said rail, film holding means comprising a stationary lug adapted to enter a perforation formed at one lower corner of a film strip and a movable lug arranged to enter another perforation formed at the other lower corners of said strip, pivotally mounted lugs arranged to enter perforations formed at the upper corners of said strip, means for moving said pivoted lugs upwardly and outwardly relative to said stationary and movable lugs to cooperate therewith to support and tension said strip, and separate and independent brackets in said frame for operatively connecting said lugs to said frame.

4. A film holder comprising a top rail, a rectangular metal frame secured at one end to said rail and formed with parallel side members, a pair of brackets secured to said frame adjacent the lower corners thereof, a stationary film engaging lug on one of said brackets, arranged to engage a lower corner of a film strip positioned in said holder, a pivoted arm on the other of said brackets, a film engaging lug on said arm arranged to engage the other lower corner of said strip, a pair of brackets on said side members adjacent the opposite upper corners of said strip, bellcranks pivotally mounted on said last mentioned pair of brackets, film engaging lugs carried by said bellcranks and arranged to engage said strip at said opposite upper corner, said lugs serving to support said strip in said holder, and separate and independent brackets on said frame for pivoting said bellcranks to move the lugs thereon relative to each other and to the other lugs to stretch and tension said strip.

5. A film holder comprising a top rail, an open metal frame formed with parallel side members and secured at one end to said rail, a pair of brackets secured to said frame adjacent the lower corners thereof, a stationary film engaging lug on one of said brackets, a pivoted arm on the other of said brackets, a film engaging lug on said arm, said lugs being arranged to engage opposite lower corners of a film strip positioned in said holder, a pair of brackets on said side members adjacent opposite upper corners of said strip, pivot pins carried by said last pair of brackets, bellcranks pivotally mounted on said pins, film engaging lugs carried by said bellcranks and arranged to engage said opposite upper corners and cooperating with said other lugs to support said strip in said holder, means for rotating said bellcrank in one direction to bring the lugs thereon into film engaging position, and resiliently means engaging said bellcranks and tending to rotate the latter in the opposite direction to tension said film.

FREDERICK C. MARTIN.